US012640982B2

(12) United States Patent
Brocato

(10) Patent No.: US 12,640,982 B2
(45) Date of Patent: May 26, 2026

(54) NETWORK CONFIGURATION USING NATURAL LANGUAGE

(71) Applicant: Edgio, Inc., Phoenix, AZ (US)

(72) Inventor: Mark Brocato, Tallinn (EE)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/660,718

(22) Filed: May 10, 2024

(65) Prior Publication Data

US 2024/0380653 A1 Nov. 14, 2024

Related U.S. Application Data

(60) Provisional application No. 63/465,403, filed on May 10, 2023.

(51) Int. Cl.
*H04L 41/0806* (2022.01)
*H04L 41/0866* (2022.01)
*H04L 41/16* (2022.01)
*H04L 41/22* (2022.01)

(52) U.S. Cl.
CPC ...... *H04L 41/0806* (2013.01); *H04L 41/0866* (2013.01); *H04L 41/16* (2013.01); *H04L 41/22* (2013.01)

(58) Field of Classification Search
CPC . H04L 41/0806; H04L 41/0866; H04L 41/22; H04L 41/16
See application file for complete search history.

(56) References Cited

U.S. PATENT DOCUMENTS

| | | | | |
|---|---|---|---|---|
| 10,250,641 | B2 * | 4/2019 | Porras | H04L 63/20 |
| 11,562,140 | B2 * | 1/2023 | Thomas | G06F 40/253 |
| 11,924,292 | B2 * | 3/2024 | Dickens | H04L 67/34 |
| 11,968,088 | B1 * | 4/2024 | Yan | H04L 41/0823 |
| 12,045,609 | B1 * | 7/2024 | Sawant | G06F 40/20 |
| 12,061,970 | B1 * | 8/2024 | Lo | G06N 3/10 |
| 12,313,277 | B1 * | 5/2025 | Long | F24F 11/63 |
| 2003/0187646 | A1 * | 10/2003 | Smyers | G10L 15/22 704/E15.04 |
| 2007/0136301 | A1 * | 6/2007 | Jardin | H04L 41/5054 |
| 2013/0290520 | A1 * | 10/2013 | Noo | H04L 41/12 709/224 |
| 2016/0080221 | A1 * | 3/2016 | Ramachandran | H04L 43/0817 709/224 |

(Continued)

FOREIGN PATENT DOCUMENTS

GB 2588884 A * 5/2021 ......... H04L 41/0894

*Primary Examiner* — Jerry B Dennison
(74) *Attorney, Agent, or Firm* — Richard LaPeruta

(57) ABSTRACT

Described herein are various examples of techniques for generating a network configuration and configuring a network based on said configuration. In some embodiments, there is provided a method comprising receiving a natural language input describing a desired behavior of a network and generating a network configuration based at least in part in the natural language input. Generating the network configuration may comprise generating structured data indicating one or more rules for the network to implement the desired behavior. The method may further comprise configuring the network based on the structured data indicating the one or more rules to implement the desired behavior of the network.

19 Claims, 5 Drawing Sheets

300

(56) References Cited

U.S. PATENT DOCUMENTS

| | | | |
|---|---|---|---|
| 2016/0218933 A1* | 7/2016 | Porras | H04L 41/147 |
| 2016/0219048 A1* | 7/2016 | Porras | H04L 41/147 |
| 2016/0219078 A1* | 7/2016 | Porras | H04L 41/14 |
| 2023/0305822 A1* | 9/2023 | Ferrucci | G06N 20/00 |
| 2024/0289125 A1* | 8/2024 | Kaufman | G06F 8/61 |
| 2024/0378028 A1* | 11/2024 | Chartrand | G06F 8/36 |
| 2024/0380653 A1* | 11/2024 | Brocato | H04L 41/22 |
| 2024/0411652 A1* | 12/2024 | Prabhakar | H04L 63/20 |
| 2025/0023779 A1* | 1/2025 | Sumedrea | H04L 41/0894 |
| 2025/0119354 A1* | 4/2025 | Vasseur | H04L 41/147 |

* cited by examiner

100

<u>200</u>

<u>300</u>

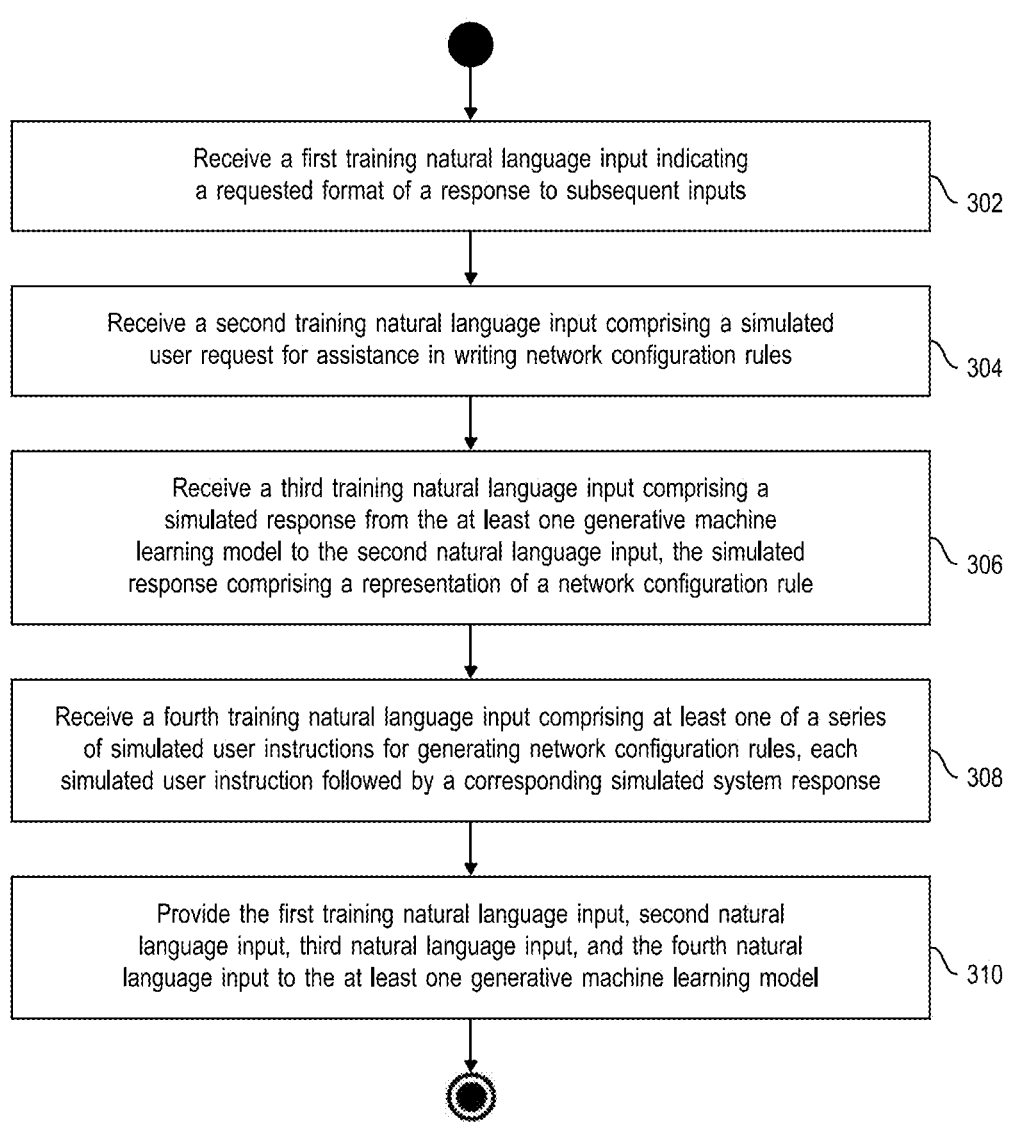

Receive a first training natural language input indicating
a requested format of a response to subsequent inputs        ⟍ 302

Receive a second training natural language input comprising a simulated
user request for assistance in writing network configuration rules        ⟍ 304

Receive a third training natural language input comprising a
simulated response from the at least one generative machine
learning model to the second natural language input, the simulated
response comprising a representation of a network configuration rule        ⟍ 306

Receive a fourth training natural language input comprising at least one of a series
of simulated user instructions for generating network configuration rules, each
simulated user instruction followed by a corresponding simulated system response        ⟍ 308

Provide the first training natural language input, second natural
language input, third natural language input, and the fourth natural
language input to the at least one generative machine learning model        ⟍ 310

RECEIVE INPUT INDICATING INSTRUCTIONS
TO GENERATE A NETWORK CONFIGURATION ⟍ 402

OUTPUT NETWORK CONFIGURATION ⟍ 404

PROCESS NETWORK CONFIGURATION ⟍ 406

VALIDATE NETWORK CONFIGURATION ⟍ 408

RECEIVE INSTRUCTIONS
TO CONFIGURE NETWORK ⟍ 410

CONFIGURE NETWORK BASED
ON NETWORK CONFIGURATION ⟍ 412

NETWORK CONFIGURATION USING NATURAL LANGUAGE

CROSS REFERENCE TO RELATED APPLICATION

This application claims the benefit under 35 U.S.C. § 119 (e) of U.S. Provisional Patent Application No. 63/465,403, filed May 10, 2023, the entire contents of which are incorporated herein by reference.

BACKGROUND

Computer networks such as Content Delivery Networks (CDNs) allow for the widespread distribution of data and content to users. For example, a typical CDN includes a plurality of distributed servers in different locations; each server hosting some or substantially all of the same content as any other server in the network. This architecture allows for low latency-high performance delivery of content by bringing the source of the content closer to the user. Such networks often have a wide array of configuration options to help network operators deliver the content in a manner that suits their business needs and technical restrictions.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a flowchart of an additional method that may be implemented in some embodiments to train a configuration generation facility;

DETAILED DESCRIPTION

Figure 1:
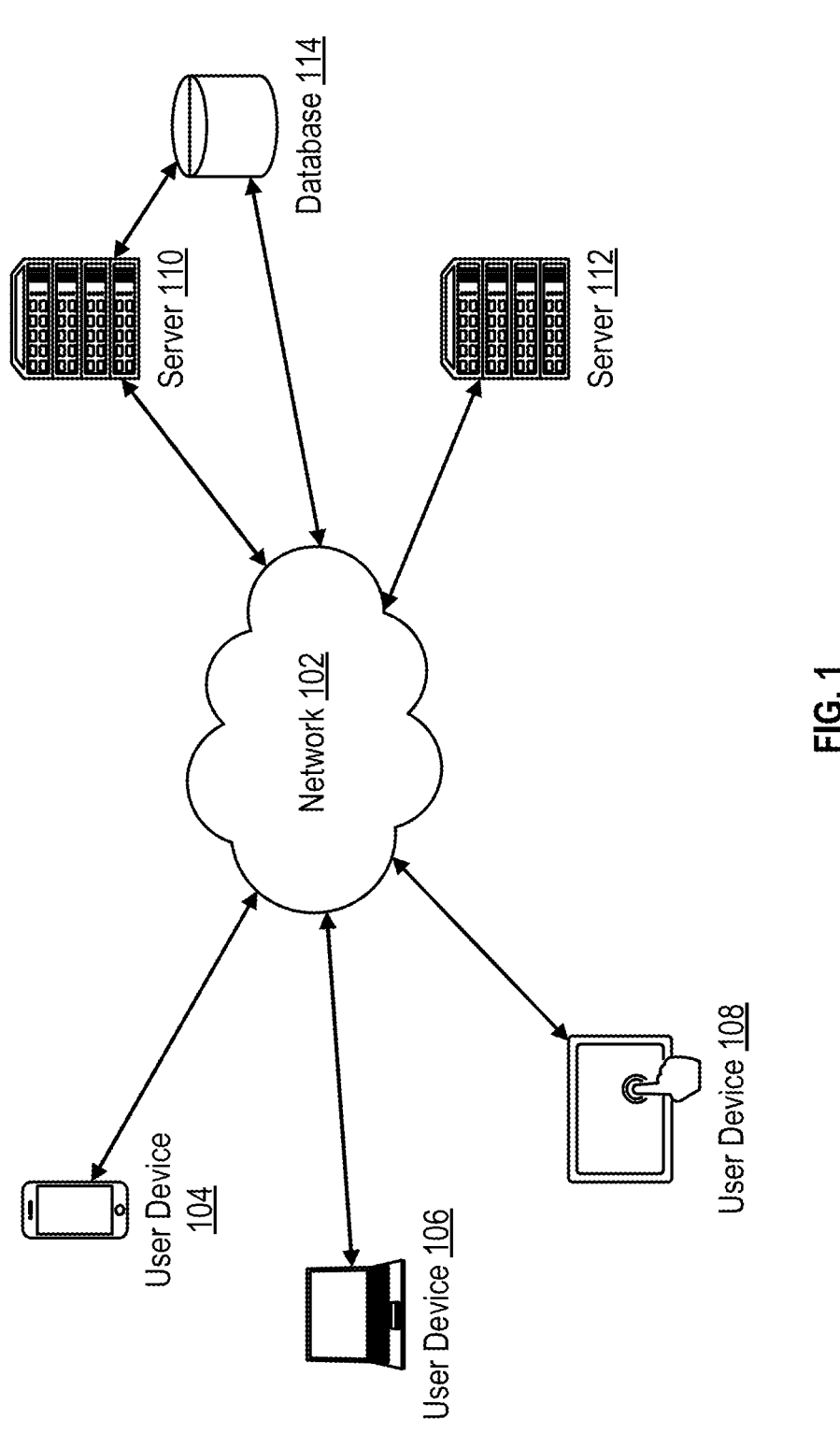
FIG. 1 illustrates a system within which some embodiments may operate.

Described herein are various techniques for configuring a network, including examples of techniques for configuring a content distribution network (CDN). The configuration is performed in accordance with a network configuration, which may include structured data indicating one or more rules to implement a desired behavior in a network. Such behaviors may include behaviors related to include requests for content, such as whether and how to store requested content in a cache, how to redirect requests for content, or otherwise how to process requests for content and the content received in response to the requests. In some embodiments described herein, the desired behavior of the network may be received as a natural language input, such as text in a natural language describing the desired behavior. The structured data indicating the one or more rules may be generated based on such natural language input. In some, but not necessarily all, embodiments the generation of the structured data may be done using one or more models trained to generate network configuration information, including a chatbot trained to generate network configuration information from natural language input.

Configuring communications networks in general and CDNs in particular can be a tedious and technically challenging process that is generally performed manually. Different networks can have different configuration parameters and even for a same network there may be different configurations that are used at different times. Even one network configuration may include different options that apply to different content, or to content at different times, for different requestors, or under different conditions. Thus, network configurations can be diverse and variable, with different behaviors wanted or needed between different content or websites and different content owners or recipients/requestors.

Network management systems may have complex user interfaces (UIs) filled with numerous forms, buttons, inputs, sliders, etc., each of which can control a different network parameter and impact network performance to provide network operators and administrators with extensibility and flexibility.

Often, network management UIs and configuration languages have steep learning curves due to the amount of parameters that need to be or can be determined or set. As noted, the flexibility of CDN configuration is often desired to allow for many different behaviors for different content, or different behaviors for the same content at different times, or different behaviors in response to different network conditions, and so on, leads directly to complexity in configuration. But this same flexibility presents challenge. There are many different parameters to be learned with respect to how and when they may be used, and given the number of parameters and combinations of parameters, there can be a steep learning curve.

This extensibility and flexibility of network configuration has also previously impeded efforts to automate network configuration. Automation is more straightforward when there are fewer parameters or fewer combinations, or when the conditions that may give rise to a particular combination of parameters are simpler. The extensibility of networks runs directly counter to that in conventional networks. Lacking a straightforward way to specify network configuration, network configuration specification has not been translated into an automated process. Instead, it has remained largely manual, as users are required to explicitly identify desired behaviors through a specification interface in which they specify each term of a desired network behavior.

The inventors have recognized and appreciate that a natural language interface for defining network configurations would be desirable. With such a natural language interface, a user could specify a desired network behavior or other desired network configuration using natural language text, such as free text in a human language (e.g., English). The inventors have also recognized and appreciated, however, that the same flexibility that led to complex user interfaces in the past and impeded more straightforward techniques or automation would also impede a natural language interface. Accordingly, a natural language interface for network configuration was not achievable with conventionally available mechanisms for defining such configurations.

Described herein are examples of a framework for streamlined network configuration of communications networks by allowing users to generate network configurations using natural language, including using machine learning (ML)/ artificial intelligence (AI) models that interpret natural language. In some aspects, the techniques described herein relate to a method for generating a network configuration by receiving a natural language input describing the desired network configuration, generating a network configuration including one or more network parameters, and outputting the network configuration to a network management system to configure a network based on the network configuration. In some embodiments, a network operates with structured data defining network configuration, such as, for example, structured data defining one or more rules describing behavior of the network. The structured data may be used in some embodiments to define network configuration based on a natural language input. For example, a natural language input may be translated by one or more natural language models to structured data defining one or more behaviors of a network. For example, a generative model may generate structured data defining a network configuration through processing natural language input describing the network configuration. Using the structured format for network configuration may mitigate difficulties faced by prior systems that received configuration data in other ways, including by reducing a configuration burden associated with training one or more models to generate network configuration information from natural language input.

In some embodiments, network configurations can be referred to as rules, including, for example, a CDN rule. In some embodiments, a network configuration can include a plurality of rules. In some embodiments, a network configuration can include a set of parameters or conditions to manage and optimize the distribution of content across a network. In some embodiments, these parameters can be related to or control various aspects of the network, such as caching behavior, request handling, access control, traffic redirection, content compression, and security features. In some embodiments, a caching rule can dictate how and when content should be cached by the network. For example, different content types (e.g., images or JavaScript files) can have different caching durations (e.g., hours or days). In some embodiments, a compression rule can dictate which types of content should be compressed. In some embodiments, access control rules can manage access to content by using predetermined parameters (e.g., IP addresses, geographic regions). In some embodiments, redirection rules can dictate to the network how to redirect requests to different content based on parameters such as user's device type, browser, or geographical location. In some embodiments, security rules can indicate the type of security features enforced by the network (e.g., SSL/TLS encryption, DDOS protection, or Web Application Firewalls (WAF)).

In some embodiments, network rules or configurations can be in the form of structured data. Structured data may be specified, in some embodiments, in a markup language, a Domain Specific Language (DSL), a configuration API, a runtime API in a programming language such as JavaScript, Python, or Rust, or other textual format. Illustrative formats for structured data include Javascript Object Notation (JSON), Extensible Markup Language (XML), or YAML. Structured formats provide a number of features that allow network operators and administrators to manage, maintain, and integrate these configurations or rules into their systems more easily. For example, some of said formats are designed to be human-readable, making it easier for developers and network administrators to understand, create, and modify the rules or configurations. They may also provide a consistent structure and syntax for the configurations, making them easier to maintain and update which also helps reduce errors due to incorrect formatting or syntax. Also, many structured formats can be validated using validation mechanisms that ensure that the rules conform to a specific structure or set of constraints; this helps catch errors early in the configuration design process. Structured formats can be easily extended to accommodate new features or requirements, without breaking compatibility with existing tools or systems.

In some embodiments, a configuration generation facility is used to translate natural language inputs or messages into a network configuration. In some embodiments, the configuration generation facility can receive inputs from a user (e.g., a network operator or administrator) and generate a network configuration in a structured format. In some embodiments, the responses of the configuration generation facility are progressively influenced by prior inputs. In some embodiments, the configuration generation facility can be trained by receiving a series of inputs or messages in the form of natural language text where each input or message instructs the facility to respond in subsequent responses a particular way. In some embodiments, a configuration generation facility or a configuration processing facility can include, or interface with (e.g., as a service outside of the facility but with which the facility interacts), a generative natural language model with a chat interface such as ChatGPT available from OpenAI. Other embodiments are possible that do not use a chat interface or an external service with a chat interface, or that use an external service other than ChatGPT. Accordingly, in other embodiments one or more models may be trained to process natural language input and generate network configuration information, including structured data defining a network configuration. Embodiments are not limited to operating with a particular form of model, examples of which include generative transformers or other neural networks.

In some embodiments, during training, the configuration generation facility can receive inputs from the user indicating basic principles for responding. Then, in some embodiments, the facility can receive different types of parameters and instructions on how to create or what the format of a network configuration should be. In some embodiments, the facility can respond with a sample output (e.g., a generated network configuration). Optionally, in some embodiments, the facility can receive additional inputs if further training is needed.

In some embodiments, once the configuration generation facility has been trained, the configuration generation facility can receive inputs from the user indicating actual instructions to generate a network configuration. In some embodiments, the configuration generation facility can provide an output network configuration in the format indicated during training. In some embodiments, the network configuration can be received by a configuration processing facility from the configuration generation facility. In some embodiments, the configuration processing facility can validate the network configuration and provide it to a network management system to configure the network. In some embodiments, manual validation of the network configuration may be performed by a human and the results stored for further training of the configuration generation facility.

In some embodiments, the system includes one or more validation models that are trained to validate network configurations based on pre-validated format schemas. The validation model(s) can be a machine learning model that is trained on a dataset of valid network configurations and their corresponding format schemas.

The training process for the validation model may in some cases involve presenting the model with a network configuration and its corresponding format schema, and training the model to recognize the correspondence between the configuration and the schema. The model may be trained to output a validation score or a binary validation result (valid or invalid) for a given network configuration.

In operation, the validation model receives a generated network configuration as input and compares the configuration to the pre-validated format schemas it was trained on. The validation model outputs a validation result indicating whether the network configuration represents a valid configuration for the network. This validation result can be used to ensure that the network configurations generated by the system are valid and can be correctly implemented by the network.

Described below are illustrative embodiments of approaches for generating and validating a network configuration using a configuration generation facility and a configuration processing facility. It should be appreciated, however, that the embodiments described below are merely exemplary and that other embodiments are not limited to operating in accordance with the embodiments described below.

FIG. 1 illustrates a system 100 within which some embodiments may operate. Not all the components of system 100 may be required to practice the disclosure, and variations in the arrangement and type of the components may be made without departing from the spirit or scope of the disclosure.

As shown, system 100 can include a network 102 and one or more user devices 104-108 communicatively coupled to one or more servers 110-112 via network 102. In some embodiments, database 114 may be communicatively coupled to server 110 and/or network 102. User devices 104-108 and/or servers 110-112 may be embodied on computing device 500 as discussed in relation to FIG. 5. Generally, however, user devices 104-108 can include virtually any portable computing device capable of receiving and sending a message over a network, such as network 102. In some embodiments, user device 104-108 can also be described generally as client devices that are configured to be portable.

In some embodiments, user device 104-108 can also include at least one client application that is configured to receive content from another computing device such as servers 110-112. In some embodiments, the client application can include a capability to request, receive, render, and display textual content, graphical content, audio content, and the like. In some embodiments, the client application can further provide information that identifies itself, including a type, capability, name, version, and the like. One example of a client application is a web browser.

Network 102 may be or include any one or more wired and/or wireless, local- and/or wide-area communication network(s), including one or more enterprise networks and/or or the Internet. Embodiments are not limited to operating with any particular type of network.

In some embodiments, network 102 can include any of a variety of wireless sub-networks that may further overlay stand-alone ad-hoc networks, and the like, to provide an infrastructure-oriented connection for user device 104-108, servers 110-112, and/or database 114. Such sub networks can include mesh networks, Wireless LAN (WLAN) networks, cellular networks, and the like. In some embodiments, a wireless network may include virtually any type of wireless communication mechanism by which signals may be communicated between computing devices.

Network 102 may be enabled to employ any form of communication media for communicating information from one electronic device to another. Also, network 102 can include the Internet in addition to local area networks (LANs), wide area networks (WANs), or direct connections. According to some embodiments, a "network" should be understood to refer to a network that may couple devices so that communications may be exchanged (e.g., between a server and a client device) including between wireless devices coupled via a wireless network, for example. A network may also include mass storage or other forms of computer or machine-readable media, for example.

In some embodiments, network 102 can comprise a content distribution network(s). A "content delivery network" (sometimes referred to instead as a "content distribution network") (CDN) generally refers to a distributed content delivery system that comprises a collection of computers, computing devices, and servers linked by a network or networks.

In some embodiments, servers 110-112 can further provide a variety of services that include, but are not limited to, email services, instant messaging (IM) services, streaming and/or downloading media services, search services, photo services, web services, social networking services, news services, third-party services, audio services, video services, mobile application services, or the like. Such services, for example can be provided via the servers 110-112, whereby a user is able to utilize such service upon the user being authenticated, verified or identified by the service. In some embodiments, servers 110-112 can store, obtain, retrieve, or provide user data corresponding to the users of user devices 104-108 or any other device on network 102, network traffic data for any device on network 102, internal logs of servers 110-112, or any other type of data that may be exchanged on network 102.

Servers 110-112 may be capable of sending or receiving signals, such as via a wired or wireless network, or may be capable of processing or storing signals, such as in memory as physical memory states. According to some embodiments, a "server" should be understood to refer to a service point which provides processing, database, and communication facilities. In some embodiments, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

Devices capable of operating as a server may include, as examples, dedicated rack-mounted servers, desktop computers, laptop computers, set top boxes, integrated devices combining various features, such as two or more features of the foregoing devices, or the like. In some embodiments, users are able to access services provided by servers 110-112 via the network 102 using their various devices 104-108.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Max®, and the like), instant messaging applications, blog, photo or social networking applications (e.g., Facebook, Twitter, Instagram®, and the like), search applications (e.g., Yahoo! Search), and the like, can be hosted by servers 110 or other servers on network 102.

Thus, the server 110, for example, can store various types of applications and application related information including application data and user profile information (e.g., identifying and behavioral information associated with a user).

Moreover, although FIG. 1 illustrates servers 110 and 112 as single computing devices, respectively, the disclosure is not so limited. For example, one or more functions of servers 110-112 can be distributed across one or more distinct computing devices. Moreover, in one embodiment, servers 110 and/or 112 can be integrated into a single computing device, without departing from the scope of the present disclosure.

In some embodiments, server 110 may be configured to store and execute a configuration generation facility that may operate in accordance with one or more techniques described herein to generate a network configuration. In some embodiments, the entity identification facility may receive inputs entered by the user using user device 104, user device 106, user device 108, or directly to entered into server 110.

Figure 2:
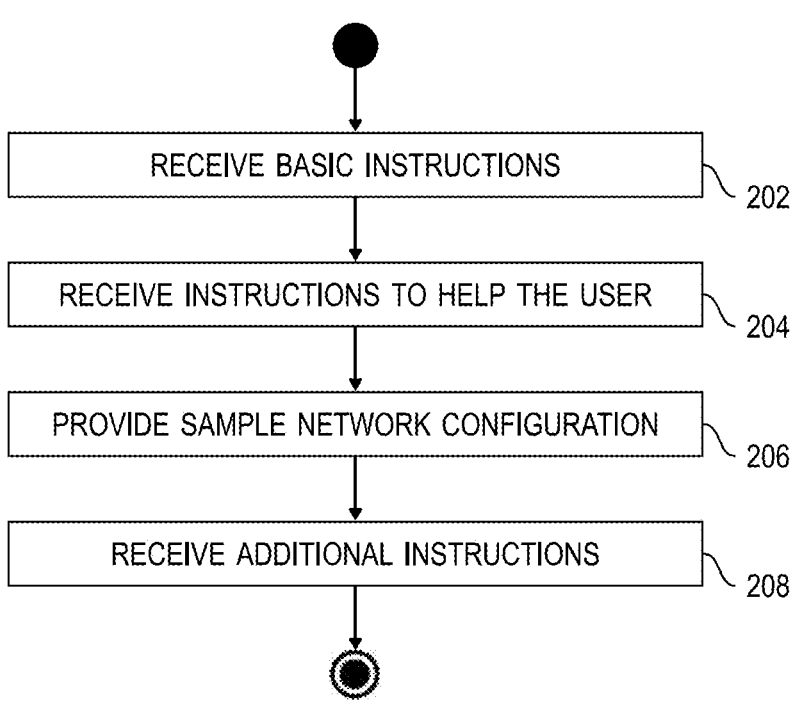
FIG. 2 is a flowchart of a method that may be implemented in some embodiments to train a configuration generation facility.

FIG. 2 is a flowchart of a method that may be implemented in some embodiments to train a configuration generation facility. Method 200 may be implemented on a server (e.g., server 110 or 112 discussed in relation to FIG. 1) or other computing device on a network (e.g., computing device 500 discussed in relation to FIG. 5).

In Step 202, method 200 can include receiving by a configuration generation facility an input from the user including basic behavior instructions or principles. In some embodiments, the basic behavior instructions can instruct the facility on how to behave or respond to inputs from the user. Instructing the facility may include instructing a chat interface on how to respond to input during a dialog with the chat interface, in the embodiments that use a chat interface. In some embodiments, the input can be in the form of natural language text. In some embodiments, the basic behavior instructions can include the type of network for which network configurations will be generated. In some embodiments, the basic behavior instructions can include the format of the network configurations. The following is a non-limiting example of an input with basic behavior instructions:

You help users write rules for a CDN. You only respond with JSON. You do not explain your solutions In Step 204, method 200 can include receiving configuration instructions from the user to help the user generate a network configuration. In some embodiments, the configurations instructions can include conditions, actions, or features. In some embodiments, the configuration instructions can include additional parameters (e.g., hints) on how to treat the conditions, actions, or features. The following is a non-limiting example of an input with instructions to help the user:

I need help writing rules for a CDN. Each rule can have conditions and actions.

Here are the possible conditions: {conditions}

Here are the possible features: {features}

Hints:

Conditions can be combined with AND and OR operators.

When you generate a regular expression, be sure to escape \"\\\" with \"\\\\\".

List the rules that I should apply to do the following: \"Cache GET requests for paths under/products/* at the edge for 10 minutes and prevent caching in the browser\".

In some embodiments, "conditions" in this example can be provided in the form of a JSON array with one or more items. The conditions may identify circumstances under which a behavior applies and may be specified using a variety of characteristics of content, requests, or other network content. The following is a non-limiting example of a condition item of a JSON array:

```
{
"name": "request.path",
    "operators": [
        "regexp",
        "not:regexp",
        "path-to-regexp",
        "not:path-to-regexp",
        "equals",
        "not:equals",
        "path-to-regexp",
        "not:path-to-regexp"
    ],
    "type": "string",
    "hint": "The URL path"
}
```

In some embodiments, "features" from the example above can be provided in the form of a JSON array with one or more items. The features may define behavior that applies when the corresponding conditions are met. The following is a non-limiting example of a feature item of a JSON array:

```
{
    "name": "caching.bypass_client_cache",
    "type": "boolean",
    "hint": "true to prevent caching on the client"
}
```

In this example, a true or false ("Boolean") value defines whether client caching is prevented. The name of the rule in the structured data set is "caching.bypass_client_cache" and the value is set according to the value understood from the natural language input. The following is another non limiting example of a "feature" item of a JSON array:

```
{
    "name": "url.url_rewrite",
    "hint": "Rewrites the request path before sending the request to the origin. Value
is an array of objects with source, destination, and syntax properties.",
        "type": {
        "arrayOf": {
            "source": {
            "type": "string",
            "hint": "An express-style path expression that matches the URL to redirect
from"
            },
```

-continued

```
    "destination": {
      "type": "string",
      "hint": "The destination path with regexp group references like $1"
    },
    "syntax": {
      "type": "string",
      "hint": "\\"regexp\\" when using a regular expression or \\ "path-to-
regexp\\" when using an express-style path expression. Use \\"path-to-regexp\\"
if at all possible."
    }
  }
 }
}
```

In Step 206, method 200 can include generating and providing an output network configuration to the user. In some embodiments, the network configuration can be based on the basic behavior instructions and the configuration instructions received as natural language inputs in Steps 202 and 204. The following is a non-limiting example of an output network configuration:

```
{
  "conditions": [
    { "name": "request.method", "value": "GET", "operator": "equals" },
    {
      "name": "request.path",
      "value": "/products/:path*",
      "operator": "path-to-regexp"
    }
  ],
  "operator": "and",
  "features": [
    { "name": "caching.max_age", "value": [{ "key": 200, "value": "10m" }] },
    { "name": "caching.bypass_client_cache", "value": true }
  ]
}
```

Optionally, in Step 208, method 200 can include receiving additional training instructions to fine tune training or to address more complicated configurations. The following is a non-limiting example of additional training instructions:

List the rules in JSON that I should apply to: {simulated user instructions}.

In this example, when input to the facility, the "simulated user instructions" would include example natural language input corresponding to a desired network configuration. When input to the facility, the facility may respond with a network configuration, such as in a JSON format per the instructions. When the network configuration is received in the structured format, the user may in some cases provide additional training data indicating whether the output was correct or offering edits to the output to make it more correct, which the facility may learn on and integrate into its future output. This process of step 208 may be performed a desired number of times, such as until a user deems the facility to have learned how to correctly output structured data for a network configuration based on natural language input.

In some examples, one or more of the systems described herein (e.g., the configuration generation facility, the configuration processing facility, etc.) may utilize or implement a "few shot" method to generate a network configuration. A "few shot" method of training may involve a specialized approach to training generative machine learning models using a minimal set of examples to adapt the model to perform specific tasks. Hence, such a method may leverage a model that has already undergone extensive pre-training on a broad corpus of general data, thereby acquiring a foundational understanding of language and a wide-ranging knowledge base.

In the context of the few shot method, a model may be first provided with a concise description of the task it is expected to perform. Following this, the model is presented with a small number of carefully selected examples that epitomize the task. These examples may include both an input and a desired output, allowing the model to understand the direct relationship between given inputs and expected outputs.

FIG. 3 is a flowchart of a method that may be implemented in some embodiments to train a configuration generation facility. Method 300 may be implemented on a server (e.g., server 110 or 112 discussed in relation to FIG. 1) or other computing device on a network (e.g., computing device 500 discussed in relation to FIG. 5).

As illustrated in FIG. 3, a few shot training method may proceed through a series of steps. Initially, at Step 302, the configuration generation facility may receive a first training natural language input that indicates a requested format of a response to subsequent inputs. The first training input may be similar to one or more of the inputs described above in reference to Step 202 of method 200. This input sets the stage for the model's output structure, ensuring consistency with the system's requirements.

At Step 304, the configuration generation facility may receive a second training natural language input comprising a simulated user request for assistance in writing network configuration rules. This input may serve as an example of the type of requests the model will need to process and/or the kind of network configuration rules it will need to generate. In some examples, the second training natural language input may be similar to one or more of the inputs described above in reference to Step 204 of method 200.

At Step 306, the configuration generation facility may receive a third training natural language input comprising a simulated response from the at least one generative machine learning model to the second natural language input, the simulated response comprising a representation of a network configuration rule. This simulated response may be crafted to represent a network configuration rule in the desired structured format, demonstrating to the model how to translate a user's request into a valid network configuration. In some examples, the second training natural language input may be similar to one or more of the inputs described above in reference to Step 206 of method 200.

At Step 308, the configuration generation facility may receive a fourth training natural language input comprising at least one of a series of simulated user instructions for generating network configuration rules, each simulated user instruction followed by a corresponding simulated system response. This input consists of a series of simulated user instructions for generating network configuration rules. Each instruction is followed by a corresponding simulated system response, which the model uses to learn the nuances of generating accurate and relevant network configurations based on varied user requests. In some examples, the second training natural language input may be similar to one or more of the inputs described above in reference to Step 208 of method 200.

At Step 310, the configuration generation facility may provide the first training natural language input, second natural language input, third natural language input, and the fourth natural language input to the at least one generative machine learning model. Through an iterative process, the model assimilates the task's requirements and learns to generate network configurations that align with the user's natural language instructions and the system's structured data format. Subsequent to this training process, the configuration generation facility may further provide the actual user instructions to the generative machine learning model as described below in reference to method 400.

By employing a few shot method, embodiments of the systems and methods described herein can efficiently adapt a generative machine learning model to generate network configurations from natural language inputs with minimal additional training. Embodiments may therefore capitalize on the generative machine learning model's pre-existing knowledge and its ability to generalize from a few examples, enabling rapid deployment and reducing the time and resources required for traditional model training and/or other fine-tuning techniques.

Figure 4:
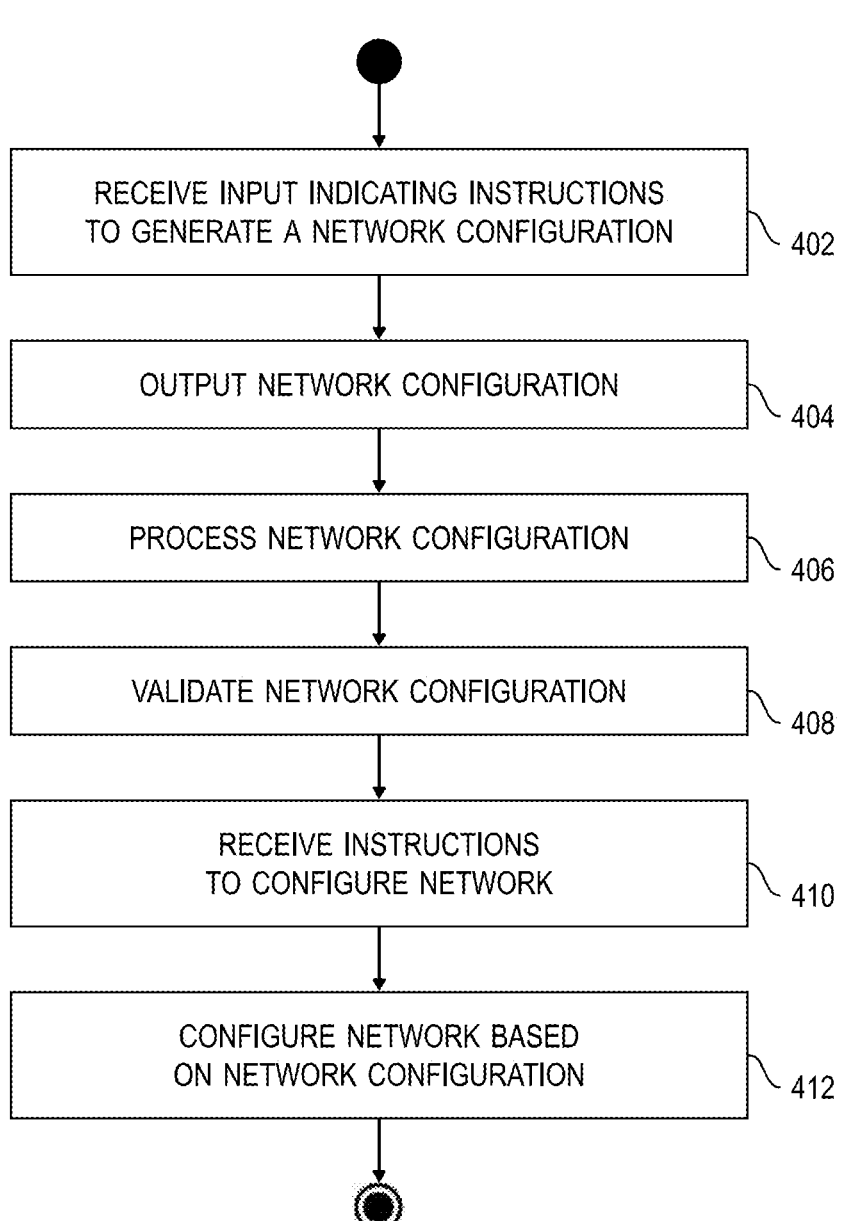
FIG. 4 is a flowchart of a method that may be implemented in some embodiments to generate a network configuration and configure a network using the network configuration.

FIG. 4 is a flowchart of a method that may be implemented in some embodiments to generate a network configuration and configure a network using the network configuration. Method 300 may be implemented on a server (e.g., server 110 or 112 discussed in relation to FIG. 1) or other computing device on a network (e.g., computing device 500 discussed in relation to FIG. 5).

In Step 402, method 400 can include receiving an input indicating instructions to generate a network configuration. In some embodiments, the input is received from the user. In some embodiments, the input is received by a configuration generation facility. The following is a non-limiting example of user instructions to generate an actual network configuration, in response to receipt from a user of a natural language input that is, in this example, indicated as "actual user instructions":

List the rules in JSON that I should apply to: {actual user instructions}.

As mentioned above, it should be appreciated that while this example of FIG. 3 operates with a chat interface of an external service, and thus includes additional dialog-related commands and/or chat-like commands, embodiments are not so limited. In other embodiments, in receipt to the "actual user instructions," those instructions may be provided to a model and structured data for a network configuration may be generated.

In Step 404, method 400 can include outputting a network configuration. The following is a non-limiting example of a network configuration:

```
{
    "conditions": [
        {
            "name": "request.path",
            "value": "/products/:path*",
            "operator": "path-to-regexp"
        }
    ],
    "operator": "and",
    "features": [
        {
            "name": "url.url__rewrite",
            "value": [
                {
                    "source": "/products/(.*)",
                    "destination": "/p/$1",
                    "syntax": "path-to-regexp"
                }
            ]
        }
    ]
}
```

In some embodiments, the preceding example can be a response by the configuration generation facility to the input: "Rewrite products/* to p/*".

In some embodiments, Step 304 can include transmitting the output network configuration from the configuration generation facility to the configuration processing facility.

In Step 406, method 400 can include processing, by the configuration processing facility, the network configuration. In some embodiments, processing the network configuration can include parsing the output and changing elements of conditions, features, or actions. For example, in some embodiments, condition names can be converted to an object with type and value properties, splitting the condition name by ".". In some embodiments, feature names can be converted to "type" and "feature" properties, splitting the name by ".". In some embodiments, condition value property can be renamed (e.g., to "matchValue"). In some embodiments, the input received in Step 402 (e.g., the user's original prompt) as a "comment" feature in the features array. In some embodiments, some conditions, such as those based on query parameters or request headers, are converted during this step. The following is a non-limiting example of a network configuration after processing by a configuration processing facility:

```
{
    "conditions": [
        {
            "ruleVariable": { "type": "request", "value": "path"},
            "matchValue": "/products/:path*",
            "operator": "path-to-regexp"
        }
    ],
    "operator": "and",
    "features": [
        {
            "type": "url",
```

-continued

```
    "feature": "url_rewrite",
    "value": [
      {
        "source": "/products/(.*)",
        "destination": "/p/$1",
        "syntax": "path-to-regexp"
      }
    ]
  }, {
    "type": "comment",
    "feature": "comment",
    "value": "Rewrite products/* to p/*"
  }
]
}
```

In Step 408, method 400 can include passing the processed network configuration to a validation model to compare the processed network configuration with existing or predetermined format schemas (e.g., a JSON schema). In some embodiments, if the validation is positive (e.g., the processed network configuration is valid) the network configuration can be provided to a user's draft folder of a network management system or other configuration UI or API. In some embodiments, the user can accept, modify, or delete the configuration. In some embodiments, the user can be prompted to provide feedback on the processed network configuration (e.g., the facility generated the correct configuration), the facility did not generate the correct configuration, the facility did not generate the correct configuration, but it was manually corrected). In some embodiments, the provided feedback can be received as an input to the configuration generation facility to further train the facility.

Additionally, in some embodiments, the system includes a validation model (which may be one or more models) that is pre-trained to validate network configurations based on pre-validated format schemas. The validation model can be a machine learning model that is trained on a dataset of valid network configurations and their corresponding format schemas.

The training process for the validation model can in some embodiments involve presenting the model with a network configuration and its corresponding format schema, and training the model to recognize the correspondence between the configuration and the schema. The model can, for example, be trained to output a validation score or a binary validation result (valid or invalid) for a given network configuration.

In operation, in some embodiments the validation model may receive a generated network configuration as input and compares the configuration to the pre-validated format schemas it was trained on. The validation model may output a validation result indicating whether the network configuration represents a valid configuration for the network. This validation result can be used to ensure that the network configurations generated by the system are valid and can be correctly implemented by the network.

By way of example, consider a scenario where a network operator wishes to configure a CDN to serve content with specific caching rules. The network operator may provide a natural language input to the system, stating, "Cache all images under the/images directory for 24 hours and prevent caching for any files with the .tmp extension."

The system's configuration generation facility processes this natural language input and generates a structured network configuration in JSON format. The generated configuration includes rules that specify caching behaviors for resources located under the/images directory and rules to bypass caching for files ending with .tmp.

The generated network configuration is then, in this example, passed to the validation model. The validation model, which has been pre-trained on a dataset of valid network configurations and their corresponding format schemas, begins its validation process. It compares the structured data of the generated configuration against the known format schemas to ensure that the rules are correctly formatted and logically consistent.

The validation model uses its training to assess the presence of required fields, the correct use of operators, and the proper syntax for the specified conditions and actions. For example, it checks that the caching duration is specified in a valid format, such as "24 h" for 24 hours, and that the rule to bypass caching for .tmp files is correctly targeting the file extension.

After the assessment, the validation model outputs a validation result. In this example, assume that the model determines that the configuration is valid. This result is then communicated back to the system, confirming that the generated network configuration is a valid configuration for the CDN.

With this validation, the network operator can confidently proceed to implement the configuration, knowing that it has been verified for correctness and is in line with the CDN's operational parameters. If the validation model had found discrepancies or errors, the system would provide feedback to the operator, who could then make the necessary adjustments or seek clarification before deployment.

This validation process ensures that configurations derived from natural language inputs are not only reflective of the operator's intent but also technically sound and ready for implementation within the network's infrastructure.

In Step 410, method 400 can include receiving instructions or natural language input by the configuration generation facility, the configuration processing facility, or some other system to configure a network based on the output network configuration, the processed network configuration, or the manually edited processed network configuration.

In Step 412, method 400 can include configuring the network based on the selected output network configuration, the processed network configuration, or the manually edited processed network configuration.

Techniques operating according to the principles described herein may be implemented in any suitable manner. Included in the discussion above are a series of flow charts showing the steps and acts of various processes that generate a network configuration based on natural language input. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of Steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 5:
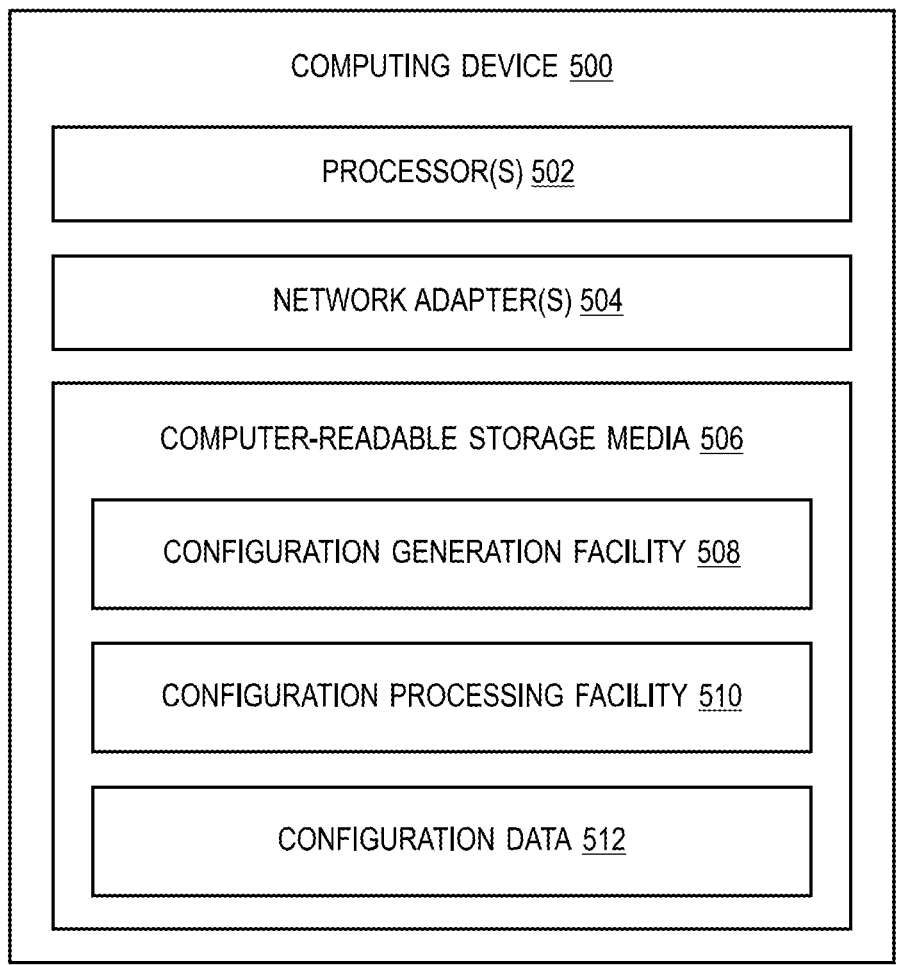
FIG. 5 is a block diagram of a computer system with which some embodiments may operate.

FIG. 5 is a block diagram of a computer system with which some embodiments may operate.

FIG. 5 illustrates one exemplary implementation of a computing device in the form of a computing device 500 that may be used in a system implementing techniques described herein, although others are possible. It should be appreciated that FIG. 5 is intended neither to be a depiction of necessary components for a computing device to operate a bot detection framework in accordance with the principles described herein, nor a comprehensive depiction.

Computing device 500 may comprise at least one processor 502, a network adapter 504, and computer-readable storage media 506. Computing device 500 may be, for example, a server, including a web server, a server of a content delivery network (CDN), including of a point of presence (POP) of a CDN, a server of a cloud computing network or data center, or other suitable server. As another example, computing device 500 may be a desktop or laptop personal computer, a personal digital assistant (PDA), a smart mobile phone, or any other suitable computing device. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable storage media 506 may be adapted to store data to be processed and/or instructions to be executed by processor 502. Processor 502 enables processing of data and execution of instructions. The data and instructions may be stored on the computer-readable storage media 506.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store a configuration generation facility 508, a configuration processing facility 510, and configuration data 512 that includes output configuration networks, processed or manually processed configuration networks and inputs.

While not illustrated in FIG. 5, a computing device 500 may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:

receiving a natural language input describing a desired behavior of a network;

generating a network configuration based at least in part in the natural language input, wherein generating the network configuration comprises generating structured data indicating one or more rules for the network to implement the desired behavior;

configuring the network based on the structured data indicating the one or more rules to implement the desired behavior of the network; and training at least one generative machine learning model to generate the network configuration using the natural language input, the training comprising:

receiving a first training natural language input indicating a requested format of a response to subsequent inputs;

receiving a second training natural language input comprising a simulated user request for assistance in writing network configuration rules;

receiving a third training natural language input comprising a simulated response from the at least one generative machine learning model to the second natural language input, the simulated response comprising a representation of a network configuration rule;

receiving a fourth training natural language input comprising at least one of a series of simulated user instructions for generating network configuration rules, each simulated user instruction followed by a corresponding simulated system response; and providing the first training natural language input, second natural language input, third natural language input, and the fourth natural language input to the at least one generative machine learning model.

2. The method of claim 1, wherein the method further comprises validating that the network configuration represents a valid configuration for the network.

3. The method of claim 1, wherein generating the network configuration based at least in part on the natural language input comprises providing the natural language input as at least one prompt to the at least one generative machine learning model.

4. The method of claim 3, wherein the at least one prompt comprises a plurality of prompts, each prompt in the plurality of prompts provided as an individual input to the at least one generative machine learning model.

5. The method of claim 4, wherein at least one prompt in the plurality of prompts instructs the at least one generative machine learning model on a requested format of an output.

6. The method of claim 4, wherein at least one prompt in the plurality of prompts simulates a user request for assistance in writing the network configuration rules.

7. The method of claim 4, wherein at least one prompt in the plurality of prompts comprises a simulated response from the at least one generative machine learning model to the natural language input, the simulated response comprising a representation of a network configuration rule.

8. The method of claim 4, wherein at least one prompt in the plurality of prompts provides to the at least one generative machine learning model at least one of a series of simulated user instructions for generating network configuration rules, each simulated user instruction followed by a corresponding simulated system response.

9. The method of claim 2, wherein validating that the network configuration represents a valid configuration for the network comprises passing the network configuration to a validation model that compares the network configuration with pre-validated format schemas.

10. The method of claim 9, wherein the validation model comprises a machine learning model pre-trained to validate network configurations based on pre-validated format schemas.

11. The method of claim 1, wherein the desired behavior of the network comprises at least one of:
    a caching behavior;
    a request handling behavior;
    an access control behavior;
    a traffic redirection behavior;
    a content compression behavior; or
    at least one security behavior.

12. The method of claim 1, wherein the one or more rules for the network comprise a set of conditions and a set of features, each condition and feature defined by at least a name, a type, and one or more operators.

13. The method of claim 12, wherein the set of conditions and the set of features in combination define the desired behavior of the network.

14. The method of claim 1, wherein the network comprises a content distribution network (CDN).

15. The method of claim 1, wherein the method further comprises:
    presenting a representation of the network configuration via a user interface; and
    receiving a user approval of the network configuration via the user interface;
    wherein configuring the network based on the structured data indicating the one or more rules to implement the desired behavior of the network is executed in response to the receiving of the user approval of the network configuration received via the user interface.

16. The method of claim 1, further comprising a second training process wherein the second training process further comprises:
    generating with the at least one model a sample network configuration based on the first natural language input and the second natural language input; and
    receiving the third natural language input indicating modifications to apply to subsequent network configuration output.

17. A system comprising:
    at least one processor; and at least one computer-readable medium having encoded thereon executable instructions that, when executed by the at least one processor, cause the at least one processor to carry out a method, the method comprising:
    receiving a natural language input describing a desired behavior of a network;
    generating a network configuration based at least in part in the natural language input, wherein generating the network configuration comprises generating structured data indicating one or more rules for the network to implement the desired behavior;
    configuring the network based on the structured data indicating the one or more rules to implement the desired behavior of the network, and
    training at least one generative machine learning model to generate the network configuration using the natural language input, the training comprising:
        receiving a first training natural language input indicating a requested format of a response to subsequent inputs;
        receiving a second training natural language input comprising a simulated user request for assistance in writing network configuration rules;
        receiving a third training natural language input comprising a simulated response from the at least one generative machine learning model to the second natural language input, the simulated response comprising a representation of a network configuration rule;
        receiving a fourth training natural language input comprising at least one of a series of simulated user instructions for generating network configuration rules, each simulated user instruction followed by a corresponding simulated system response; and
        providing the first training natural language input, second natural language input, third natural language input, and the fourth natural language input to the at least one generative machine learning model.

18. The system of claim 17, wherein generating the network configuration based at least in part on the natural language input comprises providing the natural language input as at least one prompt to at least one generative machine learning model.

19. At least one non-transitory computer-readable storage medium having encoded thereon executable instructions that, when executed by at least one processor, cause the at least one processor to carry out a method, the method comprising:
    receiving a natural language input describing a desired behavior of a network;
    generating a network configuration based at least in part in the natural language input, wherein generating the network configuration comprises generating structured data indicating one or more rules for the network to implement the desired behavior;
    validating that the network configuration represents a valid configuration for the network, and
    training at least one generative machine learning model to generate the network configuration using the natural language input, the training comprising:
        receiving a first training natural language input indicating a requested format of a response to subsequent inputs;
        receiving a second training natural language input comprising a simulated user request for assistance in writing network configuration rules;

receiving a third training natural language input comprising a simulated response from the at least one generative machine learning model to the second natural language input, the simulated response comprising a representation of a network configuration 5 rule;

receiving a fourth training natural language input comprising at least one of a series of simulated user instructions for generating network configuration rules, each simulated user instruction followed by a 10 corresponding simulated system response; and providing the first training natural language input, second natural language input, third natural language input, and the fourth natural language input to the at least one generative machine learning model. 15

\* \* \* \* \*